United States Patent [19]
Hoffman

[11] 3,842,339
[45] Oct. 15, 1974

[54] INVERTER FOR A LOAD HAVING A PARALLEL RESONANT CIRCUIT

[75] Inventor: Manfred Hoffman, Erlangen, Germany

[73] Assignee: Siemens Aktiengesellschaft, Berlin & Munich, Germany

[22] Filed: June 5, 1972

[21] Appl. No.: 260,016

Related U.S. Application Data
[63] Continuation of Ser. No. 119,157, Feb. 26, 1972, abandoned.

[30] Foreign Application Priority Data
Apr. 2, 1970  Germany............................ 2015673

[52] U.S. Cl. ................................. 321/44, 321/45 C
[51] Int. Cl. ............................................ H02m 7/48
[58] Field of Search ....................... 321/44, 45, 45 C

[56] References Cited
UNITED STATES PATENTS
| | | | |
|---|---|---|---|
| 3,207,974 | 9/1965 | McMurray | 321/45 R |
| 3,286,155 | 11/1966 | Corey | 321/45 C |
| 3,311,809 | 3/1967 | Corey et al. | 321/45 C |
| 3,349,315 | 10/1967 | Studtmann | 321/45 C |
| 3,406,330 | 10/1968 | Pelly | 321/45 R |
| 3,599,078 | 8/1971 | Pelly et al. | 321/45 C |

FOREIGN PATENTS OR APPLICATIONS
| | | | |
|---|---|---|---|
| 239,416 | 7/1969 | U.S.S.R. | 321/45 C |
| 283,382 | 12/1970 | U.S.S.R. | 321/45 C |
| 1,047,681 | 11/1966 | Great Britain | |

*Primary Examiner*—William M. Shoop, Jr.
*Attorney, Agent, or Firm*—Herbert L. Lerner

[57] ABSTRACT

An inverter has a source of direct voltage, controlled rectifiers and a load circuit having a parallel resonant circuit. The parallel resonant circuit has a capacitance, an inductance including the inductance of the load, at least a pair of controlled rectifiers connected in antiparallel for selectively closing and opening the parallel resonant circuit to provide high output frequency and an output at the inductance for providing an output voltage.

6 Claims, 1 Drawing Figure

PATENTED OCT 15 1974
3,842,339
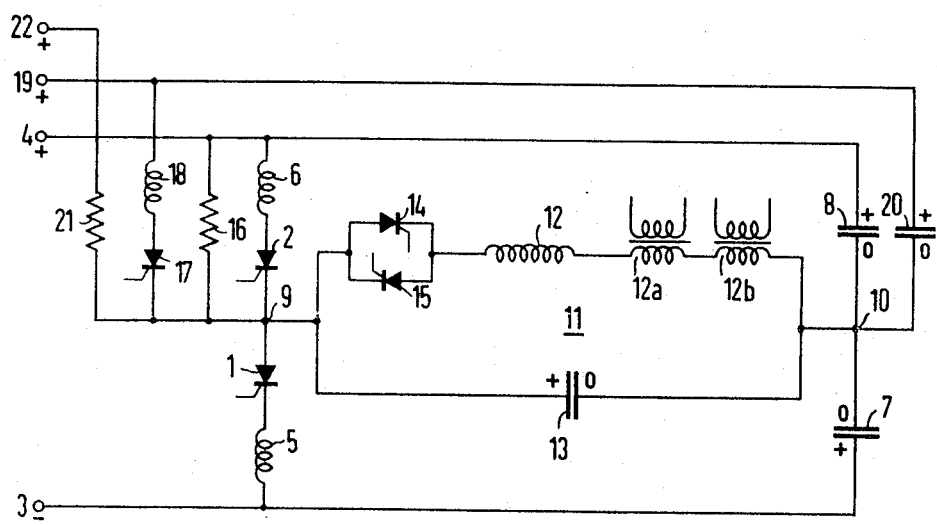

3,842,339

INVERTER FOR A LOAD HAVING A PARALLEL RESONANT CIRCUIT

CROSS-REFERENCE TO OTHER APPLICATIONS

This application is a continuation of U.S. patent application, Ser. No. 119,157, filed Feb. 26, 1971, and now abandoned.

DESCRIPTION OF THE INVENTION

The invention relates to an inverter. More particularly, the invention relates to an inverter having electronic switches such as, for example, controlled rectifiers, thyristors, or the like, and a load circuit having a parallel resonant circuit comprising a capacitance and an inductance including the inductance of the load.

Load commutated converters of the aforedescribed type, known as oscillating circuit inverters, are described, for example, on pages 161 and 162 of the SCR Manual of the General Electric Company, 1961. Such inverters are utilized, for example, for energizing induction furnaces or welding installations utilizing inductive heating. In such oscillating circuit inverters, the current characteristic becomes further and further removed from the half wave sinusoidal oscillation during strong active power or attenuation. The period of the current increase is shorter, for example, than the period of current decrease. The current conducting period is thus prolonged and the unfavorable current characteristic has a detrimental effect, for example, on series-connected transformers. Generally, the limiting frequency is less than 5 kilohertz in known oscillating circuit inverters. In known oscillating circuit inverters, the power may be controlled only via the applied direct voltage.

The principal object of the invention is to provide a new and improved inverter.

An object of the invention is to provide an oscillating circuit inverter having an increased active power output.

An object of the invention is to provide an oscillating circuit inverter which overcomes the disadvantages of known oscillating circuit inverters.

An object of the invention is to provide an oscillating circuit inverter having a favorable current characteristic.

An object of the invention is to provide an oscillating circuit inverter having a defined time coordination for all processes, thereby resulting in a considerable increase in the active power output.

An object of the invention is to provide an oscillating circuit inverter of which the power output may be selectively controlled.

An object of the invention is to provide an oscillating circuit inverter providing immediate oscillation at peak power.

An object of the invention is to provide an oscillating circuit inverter which operates with efficiency, effectiveness and reliability.

In accordance with the invention, an inverter having a source of direct voltage, electronic switch means and a load circuit has a parallel resonant circuit having a capacitance, an inductance including the inductance of the load, electronic switch means for selectively closing and opening the parallel resonant circuit to provide high output frequency and output means at the inductance for providing an output voltage.

The electronic switch means of the inverter and the electronic switch means of the parallel resonant circuit of the inverter comprise controlled rectifiers. The electronic switch means of the parallel resonant circuit comprises at least two controlled rectifiers connected in antiparallel. The two controlled rectifiers connected in antiparallel may also be two groups of controlled rectifiers connected in antiparallel.

Recharging means connected between the source of direct voltage and the parallel resonant circuit recharges the capacitance of the parallel resonant circuit. The recharging means comprises a controlled rectifier connected between the source of direct voltage and the parallel resonant circuit for selectively connecting the capacitance of the parallel resonant circuit to the source of direct voltage independently of the other controlled rectifiers of the inverter. Another inductance is connected in series with the controlled rectifier of the recharging means betweeen the source of direct voltage and the parallel resonant circuit.

A first oscillating circuit comprises a first inductance connected between the source of direct voltage and the parallel resonant circuit and the capacitance of the parallel resonant circuit. A second oscillating circuit comprises a second inductance connected between the source of direct voltage and the parallel resonant circuit and the capacitance of the parallel resonant circuit. Each of the first and second oscillating circuits has an oscillating period which is at most half as long as the oscillating period of the parallel resonant circuit.

The parallel resonant circuit may be selectively energized via its controlled rectifiers, at any desired time. Together with the control of the other controlled rectifiers of the inverter, a defined time coordination of all processes in the inverter is provided. This results in a considerable increase in the active power output. Furthermore, the power output may be controlled by shifting the firing or ignition times of the controlled rectifiers of the parallel resonant circuit relative to the firing or ignition times of the other controlled rectifiers. The selective recharging of the capacitance of the parallel resonant circuit also provides immediate oscillation of the inverter at peak power. The selection of the direct voltage applied for recharging the capacitance of the parallel resonant circuit assists the inverter to oscillate at a higher power than its constant power.

In order that the invention may be readily carried into effect, it will now be described with reference to the accompanying drawing, wherein the single FIGURE is a circuit diagram of an embodiment of the inverter of the invention.

The inverter illustrated in the FIGURE may be provided in a bridge circuit. The inverter shown in the FIGURE comprises a pair of electronic switches 1 and 2 connected in series circuit arrangement with each other. Each of the electronic switches 1 and 2 may comprise any suitable electronic switch such as, for example, a controlled rectifier, a group of controlled rectifiers, a thyristor, a group of thyristors, or the like. A first inductance 5 is connected in series circuit arrangement with the first controlled rectifier 1 between the negative polarity terminal 3 of a source of direct voltage and a circuit point 9. A second inductance 6 is connected in series circuit arrangement with the second controlled rectifier 2 between a positive polarity terminal 4 of the source of direct voltage and the circuit point 9.

Each of the first and second controlled rectifiers 1 and 2 comprises, in actuality, a group of controlled rectifiers and appropriate control circuitry for controlling the conductive condition of said controlled rectifiers, as known. The single symbols for the controlled rectifiers are shown in the FIGURE in order to maintain the clarity of illustration. The controlled rectifiers are controlled in a manner known for inverters. The source of direct voltage may comprise a source of alternating voltage and a rectifier for rectifying said alternating voltage.

A first capacitor 7 is connected in parallel with the series circuit arrangement of the controlled rectifier 1 in the inductance 5. The first capacitor 7 is connected between the negative polarity terminal 3 of the source of direct voltage and a circuit point 10. A second capacitor 8 is connected in parallel with the series circuit arrangement of the controlled rectifier 2 and the inductance 6. The second capacitor 8 is connected between the positive polarity terminal 4 of the source of direct voltage and the circuit point 10. The circuit point 9 is thus in the common connection between the first and second controlled rectifiers 1 and 2. The circuit point 10 is in the common connection between the first and second capacitors 7 and 8.

A parallel resonant circuit 11 is connected between the circuit points 9 and 10. The parallel resonant circuit 11 comprises an inductance or inductor 12 and a capacitance or capacitor 13. The output power of the inverter may be derived from the inductance 12 or from one or more transformers 12a, 12b, or the like. The parallel resonant circuit 11 also comprises two electronic switches 14 and 15 connected in antiparallel. Each of the electronic switches 14 and 15 may comprise any suitable electronic switch or group of electronic switches, a controlled rectifier or group of controlled rectifiers, a thyristor or group of thyristors, or the like. The controlled rectifiers 14 and 15 permit the selective energization or connection of the parallel resonant circuit 11 at any desired time. Power is supplied to the parallel resonant circuit or oscillating circuit 11 via the controlled rectifiers 1 and 2 and the inductances or inductors or reactors 5 and 6. The capacitors 7 and 8 function as intermediate storages for the power.

A resistor 16 is connected in parallel with the series circuit arrangement of the controlled rectifier 2 and the inductance 6. The resistor 16 is connected between the positive polarity terminal 4 of the source of direct voltage and the circuit point 9. The resistor 16 has a resistance magnitude which is in the order of magnitude of the leakage resistance of the controlled rectifiers 1 and 2. The resistor 16 maintains the charge of the capacitance 13 of the parallel resonant circuit 11.

Another electronic switch 17 is connected in series circuit arrangement with another inductance 18 between a positive polarity terminal 19 of the source of direct voltage and the circuit point 9. The electronic switch 17 may comprise any suitable electronic switch or group of electronic switches, controlled rectifier or group of controlled rectifiers, thyristor or group of thyristors, or the like. The positive polarity terminal 19 of the source of direct voltage may have the same voltage as the positive polarity terminal 4 of said source of direct voltage, although said terminal 19 preferably has a higher voltage than said terminal 4.

Another capacitor 20 is connected between the positive polarity terminal 19 of the source of direct voltage and the circuit point 10. The capacitor 20 is thus connected in parallel with the series circuit arrangement of the controlled rectifier 17 and inductance 18 and the parallel resonant circuit 11. Another resistor 21 is connected in parallel with the series circuit arrangement of the controlled rectifier 17 and the inductance 18, between the positive polarity terminal 22 of the source of direct voltage and the circuit point 9. The positive polarity terminal 22 has a voltage which is at least as high as the voltage at the positive polarity terminal 19 of the source of direct voltage, and is preferably greater than the voltage at said terminal 19.

The capacitance 13 of the parallel resonant circuit 11 may be charged in a desired manner via the controlled rectifier 17, the inductor 18, the resistor 21 and the capacitor 20. The inverter thus oscillates, immediately, at peak power. The charge applied via the resistor 21 eliminates the time delay which would result from the firing of the controlled rectifier 17 or the switching of said controlled rectifier to its conductive condition. If the starting voltage at the capacitance 13 of the parallel resonant circuit 11 is to be higher than the energizing voltage of the capacitors 7 and 8, the resistor 21 is preferably connected to the positive polarity terminal 22 of higher voltage.

The controlled rectifier 17, the inductance 18 and the capacitor 20 are also utilized to hasten the recharging of the capacitance 13 of the parallel resonant circuit 11. The controlled rectifier 17 is fired or switched to its conductive condition at a corresponding time. The selection of the voltage at the capacitance 13 of the parallel resonant circuit 11 permits the inverter to oscillate at a higher power than its constant power. The inverter then builds up to its constant condition.

In explaining the operation of the inverter, it is assumed that said inverter is at zero or no load current and that the capacitors 7, 8, 13 and 20 are charged in the manner illustrated in the FIGURE. If the controlled rectifier 14 of the parallel resonant circuit is fired or in its conductive condition at the time instant $t_1$, the capacitance 13 of said parallel resonant circuit is recharged via the inductance 12 of said parallel resonant circuit and said controlled rectifier. At a time instant $t_2$, the current in the parallel resonant circuit 11 is a maximum. That is, the voltage at the capacitance 13 of the parallel resonant circuit 11 is zero and the controlled rectifier 1 of the inverter is fired or in its conductive condition.

Due to the current in the parallel resonant circuit 11 being at a maximum magnitude, the capacitance 13 of said parallel resonant circuit is recharged more rapidly and the current in the inductance 12 of said parallel resonant circuit changes more rapidly toward zero. This is of particular importance during strong attenuation, that is, during high active power of the parallel resonant circuit 11. The parallel resonant circuit 11 is further supplied with the power required for the next oscillation, when the controlled rectifier 1 is fired or switched to its conductive condition. At the time instant $t_3$, therefore, the capacitance 13 of the parallel resonant circuit 11 is charged in a reverse direction or negatively with respect to its initial condition. The controlled rectifier 1 of the inverter and the controlled rectifier 14 of the parallel resonant circuit 11 are then extinguished or switched to their non-conductive condition.

The controlled rectifier 15 of the parallel resonant circuit 11 is then fired or switched to its conductive condition at a time instant $t_4$ and the capacitance 13 is again recharged via the inductance 12 of said parallel resonant circuit and said controlled rectifier. At a time instant $t_5$, during which the voltage at the capacitance 13 is again zero, and thus the current in the parallel resonant circuit 11 is a maximum, the controlled rectifier 2 of the inverter is fired or switched to its conductive condition and the capacitance 13 of said parallel resonant circuit is recharged to a positive voltage in the aforedescribed manner.

Upon completion of the recharging process at a time instant $t_6$, the controlled rectifier 15 of the parallel resonant circuit 11 and the controlled rectifier 2 of the inverter are again extinguished to their non-conductive condition and the initial condition which prevailed at the time constant $t_1$ is attained. The aforedescribed switching cycle is repeated periodically. The switching cycle may be interrupted at an appropriate time instant, for example the time instant $t_6$, and may be continued at a desired time.

The recharging path of the capacitance 13 of the parallel resonant circuit 11 may be opened via the controlled rectifier 17, to hasten the recharging of said capacitance and to amplify its charge. The controlled rectifier 17 is thus preferably fired or switched to its conductive condition and the controlled rectifier 2 is fired and switched to its conductive condition at the time instant $t_5$. The controlled rectifier 17 may also be fired instead of the controlled rectifier 2 at the time instant $t_5$. To accomplish this, the positive polarity terminal 19 of the source of direct voltage preferably has a higher potential than the positive polarity terminal 4 of said source of direct voltage.

The controlled rectifiers 1, 2 and 17 of the inverter do not have to be fired or switched to their conductive condition exactly at the zero passage of the voltage at the capacitance 13 of the parallel resonant circuit 11. It is possible to control the power in the circuit in a simple manner by shifting the ignition or firing angles of the controlled rectifiers 1, 2 and 17 relative to the ignition or firing angles of the controlled rectifiers 14 and 15 of the parallel resonant circuit 11.

The first inductance 5 and the capacitance 13 of the parallel resonant circuit 11 function as a first oscillating circuit. The second inductance 6 and the capacitance 13 of the parallel resonant circuit 11 function as a second oscillating circuit. The inverter of the invention has a high operating frequency. To accomplish this, it is preferable that each of the first and second oscillating circuits have an oscillating period which is at most half as long as the oscillating period of the parallel resonant circuit 11.

While the invention has been described by means of a specific example and in a specific embodiment, I do not wish to be limited thereto, for obvious modifications will occur to those skilled in the art without departing from the spirit and scope of the invention.

I claim:

1. An inverter comprising
   an input comprising a cource of direct voltage;
   a first controllable converter valve;
   a second controllable converter valve connected in series with the first converter valve;
   first power storage means comprising a first capacitor;
   second power storage means comprising a second capacitor, the first and second capacitors being connected in series with each other and the series connection of the first and second converter valves being connected in parallel with the series connection of the first and second capacitors;
   a load circuit comprising a parallel resonant circuit connected between a common point in the connection between the first and second converter valves and a common point in the connection between the first and second capacitors, the parallel resonant circuit comprising output means for connecting a load thereto, a capacitor, an inductance including the inductance of the load, and at least two alternately controllable valves connected in antiparallel with each other;
   and firing means which fire said first and second controllable converter valves at approximately maximum current in said parallel resonant circuit.

2. An inverter as claimed in claim 1, further comprising a first inductance connected in a first series circuit arrangement with the first converter valve, the first series circuit arrangement being connected in parallel with the series connection of the first capacitor and the parallel resonant circuit, and a second inductance connected in a second series circuit arrangement with the second converter valve, the second series circuit arrangement being connected in parallel with the series connection of the second capacitor and the parallel resonant circuit.

3. An inverter as claimed in claim 2,
   having a first oscillating circuit comprised by said first inductance and the capacitance of said parallel resonant circuit, and having a second oscillating circuit comprised by said second inductance and the capacitance of said parallel resonant circuit, each of said first and second oscillating circuits having an oscillating period which is at most half as long as the oscillating period of said parallel resonant circuit.

4. An inverter as claimed in claim 1, further comprising
   recharging means connected between a source of direct voltage and the parallel resonant circuit for recharging the capacitor of the parallel resonant circuit.

5. An inverter as claimed in claim 4, wherein said recharging means comprises a controlled rectifier connected between the source of direct voltage and the parallel resonant circuit for selectively connecting the capacitor of said parallel resonant circuit to said source of direct voltage independently of the other controlled rectifiers of the inverter.

6. An inverter as claimed in claim 5, wherein said recharging means further comprises another inductance connected in series with the controlled rectifier of the recharging means between the source of direct voltage and the parallel resonant circuit.

* * * * *